Figures 1, 2:
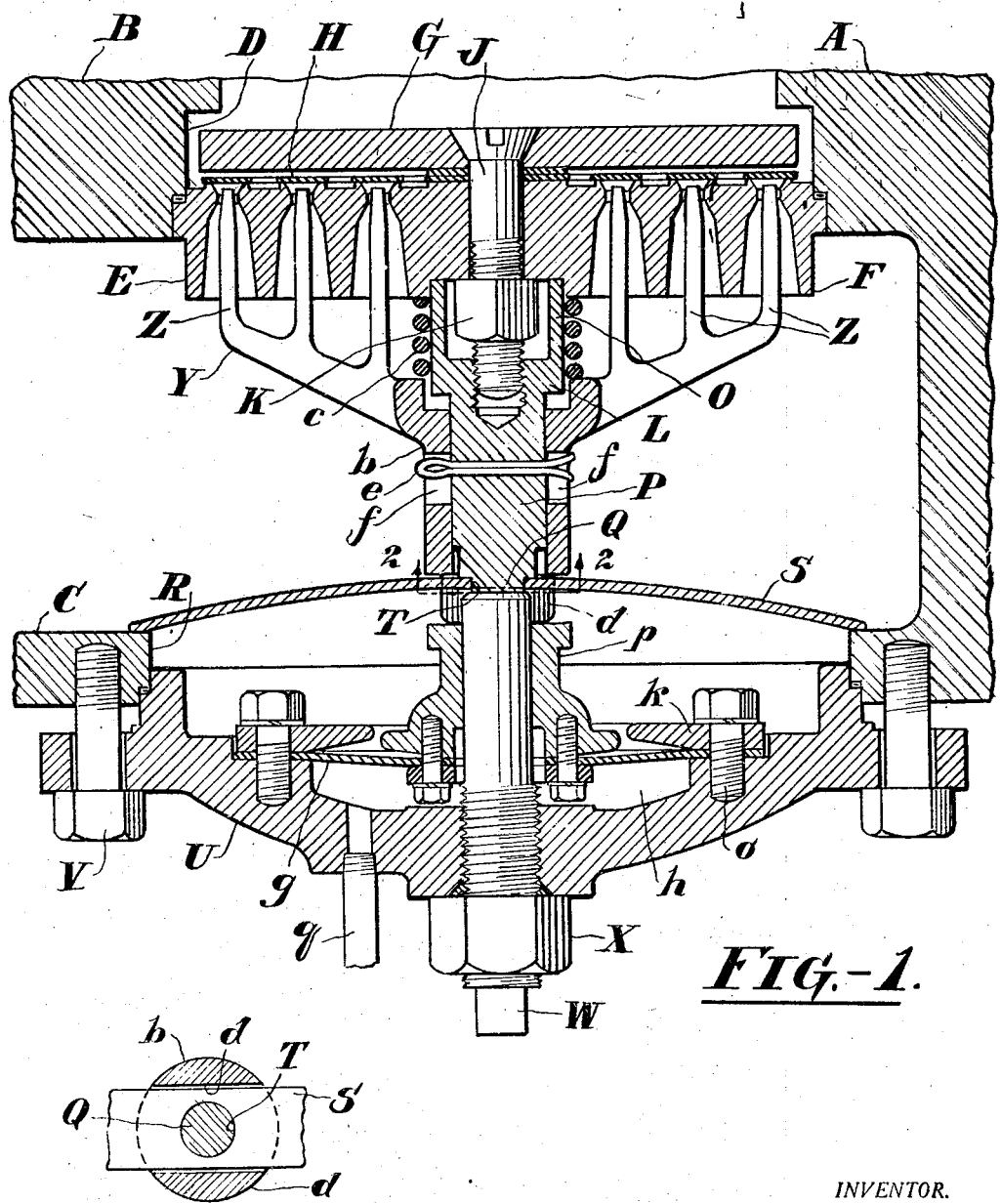

Feb. 17, 1931.  C. W. METZGAR  1,793,000
INLET UNLOADER VALVE
Filed May 18, 1928

INVENTOR.
Chester W. Metzgar
BY
HIS ATTORNEY.

Patented Feb. 17, 1931

1,793,000

UNITED STATES PATENT OFFICE

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY

INLET UNLOADER VALVE

Application filed May 18, 1928. Serial No. 278,770.

This invention relates to compressors, but more particularly to an inlet unloader valve for compressors.

One object of the invention is to facilitate the operations of installing and removing the valve mechanism in a compressor head.

Other objects will appear hereinafter, and to all of these ends the invention consists of the combination of elements and arrangements of parts having the general mode of operation substantially as hereinafter described and claimed and illustrated in the accompanying drawings, in which Figure 1 is a sectional elevation of a valve mechanism constructed in accordance with the practice of the invention and showing the valve applied to a compressor head, and Figure 2 is a transverse view taken through Figure 1 on the line 2—2 looking in the direction indicated by the arrows.

Referring to the drawings, A designates a portion of a compressor head having an inner wall B and an outer wall C. In the inner wall B is formed a valve opening D for the reception of a valve assembly generally designated by E and comprising a valve seat F, a stop plate G and a plate valve H. The members comprising the valve assembly are securely clamped together by means of a bolt J and a nut K threaded on the bolt J and bearing against the valve seat F.

The bolt J is preferably of such length that a considerable portion of the threaded end extends beyond the nut K for engagement with a jam nut L having a hollow extension O which encircles the nut K and bears with its end against the valve seat F. The jam nut L in this instance carries a projection P which extends to a point near the wall C and is reduced at its end as at Q.

The valve mechanism E may be inserted through a cover opening R in the outer wall C and is held in the assembled position by means of a plate spring S which is seated with its ends against the inner surface of the outer wall C and has a central aperture T for the reception of the reduced end Q. The plate spring S may be suitably curved so that it may exert a sufficient pressure against the outermost end of the jam nut L for firmly maintaining the valve mechanism temporarily in assembled position.

Means are provided, however, for rigidly and permanently securing the valve mechanism in the operative position. These means comprise a cover plate U seated over the cover opening R and secured to the head A by means of tap bolts V. A set screw W is threaded into the cover plate U and bears against the reduced end Q of the jam nut L. Preferably, a lock nut X is threaded on the set screw W to prevent accidental unscrewing of said set screw.

Means are provided for unseating the valve plate H whenever the storage pressure attains a certain predetermined value. These means consist of a valve lifter Y having fingers Z which project through the valve seat F to points near the valve plate H. The valve fingers form an integral part of a sleeve b disposed sildably on the projection P of the jam nut. A spring c may be disposed between the valve seat F and the sleeve b to hold the fingers Z out of contact with the valve plate H during the normal operation of the compressor. In the present instance the spring c is guided by the jam nut to prevent said spring from becoming distorted.

The sleeve b of the valve lifter may be of such length that the outermost end of the sleeve b will extend to substantially the same point as the corresponding end of the projection P. In this way when the valve assembly, together with the lifter, are placed in the valve opening D, the plate spring S may also act as an abutment for the valve lifter.

In order to prevent rotation of the valve lifter relatively to the valve mechanism, the sleeve b is provided with a pair of lugs d which lie on opposite sides of the plate spring S wherewith they may be in slidable engagement. To the end that the valve lifter may be readily maintained in the assembled position until the plate spring S is placed in position to hold the valve mechanism and the lifter, a pin e is inserted transversely through the projection P and its ends extend into oblong apertures f in opposite sides of the sleeve b. The slots f are preferably of such proportions that during the normal operation of the valve mechanism and the lifter, the sleeve b will not contact with the pin e, the function of the pin e being merely to prevent separation of the parts during the installation of the valve assembly.

In order to actuate the valve lifter Y whenever it is desired to unload the compressor, a pressure responsive device comprising in this instance a diaphragm g is carried by the cover plate U. The diaphragm g spans one end of a pressure chamber h in the cover plate and is clamped at its outer edge against said cover plate by a clamping ring k secured to the cover plate by means of tap bolts o.

To the central portion of the diaphragm g is secured a sleeve p which is guided by the set screw W and bears against the lugs d of the sleeve b for transmitting the movement of the diaphragm to the valve lifter. A pipe q threaded into the cover plate U conveys pressure fluid from a supply, such as a receiver tank (not shown), into which the compressor discharges, into the pressure chamber h for actuating the diaphragm g.

The mode of installing the valve mechanism and its adjuncts is as follows: After the valve mechanism E, together with the jam nut L, have been placed in the valve opening D, the valve lifter Y may be placed in position and the pin e inserted in the projection P to maintain the valve lifter approximately in the operative position. Thereafter the plate spring S may be placed across the opening R and the central portion thereof flexed so that the reduced end Q may be inserted in the aperture T of the spring S. In this way the spring S will exert a sufficient pressure against the projection P to maintain the valve mechanism and the lifter in the desired operative position, that is, the valve mechanism and the lifter may be prevented from dropping out of the valve opening D until the permanent securing and holding device, such as the cover plate U and the set screw W may be placed in position. This is particularly desirable in cases where the valve mechanisms are located in the bottom of the compressor head where it is difficult to maintain these parts in position while the cover plate is being secured in place.

After the cover has been fastened to the wall C by means of the tap bolts V, the set screw W may be threaded in an inwardly direction to bear against the reduced end Q of the projection P. After the desired clamping effect has been attained by means of the set screw, the lock nut X may be threaded down against the cover plate U to prevent unauthorized rotation of the set screw W.

The present invention is particularly advantageous when applied to valve mechanisms comprising a multiplicity of parts since it enables the entire valve structure to be installed and removed in three separate units, namely the valve mechanism together with the valve lifter, the plate spring which maintains the valve mechanism in the valve opening and the cover plate together with the pressure responsive device whereby the valve lifter is actuated. These are desirable features in devices of the character described and tend to greatly reduce the cost of installation of the valve mechanism in compressors.

I claim:

1. In a compressor, a compressor head having a valve opening in its inner wall and a cover opening in its outer wall, a valve seat in the valve opening and provided with a valve, a projection on the valve seat, a valve lifter slidable on the projection for unseating the valve, a plate spring interposed between the outer wall and the projection for maintaining the valve seat and the valve lifter in assembled position, said plate spring engaging the valve lifter to maintain said valve lifter in proper relationship with respect to the valve, a cover forming a closure for the cover opening, and pressure actuated means secured to the cover and bearing against the valve lifter to actuate said valve lifter.

2. In a compressor, a compressor head having a valve opening in its inner wall and a cover opening in its outer wall, a valve seat in the valve opening and provided with a valve, a projection carried by the valve seat, a plate spring seated against the outer wall and acting on the projection for maintaining the valve seat in assembled position, a cover plate forming a closure for the cover opening, a valve lifter slidably guided by the projection, lugs on the valve lifter cooperating with the plate spring for holding the valve lifter against rotation relatively to the projection, a set screw in the cover and bearing against the projection for permanently and rigidly securing the valve seat in position, pressure responsive means carried by the cover, and a sleeve secured to the pressure responsive means and guided by the set screw for transmitting the movement of the said pressure responsive means to the valve lifter for lifting the valve.

3. In a compressor, a compressor head having a valve opening in its inner wall and a cover opening in its outer wall, a valve seat in the valve opening and provided with a valve, a projection carried by the valve seat, a valve lifter slidable on the projection, means cooperating with the projection for loosely maintaining the valve lifter in the assembled position, a plate spring spanning the cover opening and bearing against the projection for firmly maintaining the valve seat in the valve opening, means on the valve lifter engaged by the plate spring to prevent rotation of the valve lifter relatively to the valve, and pressure responsive means carried by the cover plate and bearing against the said means for actuating the valve lifter.

4. In a compressor, a compressor head having a valve opening in its inner wall and a cover opening in its outer wall, a valve seat in the valve opening and provided with a valve, a projection carried by the valve seat, a plate spring bearing against the projection for maintaining the valve seat in assembled position, a valve lifter slidable on the projection for unseating the valve and adapted to abut against the plate spring, a spring disposed between the valve seat and the valve lifter for normally holding the valve lifter free from the valve, lugs on the valve lifter lying on the sides of the plate spring, a cover forming a closure for the cover opening, and pressure responsive means carried by the cover and adapted to bear against the lugs for actuating the valve lifter.

5. In a compressor, a compressor head having a valve opening in its inner wall and a cover opening in its outer wall, a valve assembly in the valve opening comprising a valve seat, a valve and a stop plate, means for clamping together the members of said assembly, a jam nut threaded on said means to bear with its end against the valve seat and carrying a projection, a valve lifter slidable on the projection for unseating the valve, a cover forming a closure for the cover opening, a set screw in the cover and bearing against the projection for maintaining the valve assembly in the valve opening, pressure responsive means slidably guided by the setscrew for actuating the valve lifter, and a spring guided by the jam nut and disposed between the valve seat and the valve lifter for normally holding the valve lifter out of contact with the valve.

In testimony whereof I have signed this specification.

CHESTER W. METZGAR.